INVENTOR.
Harold E. Haynes

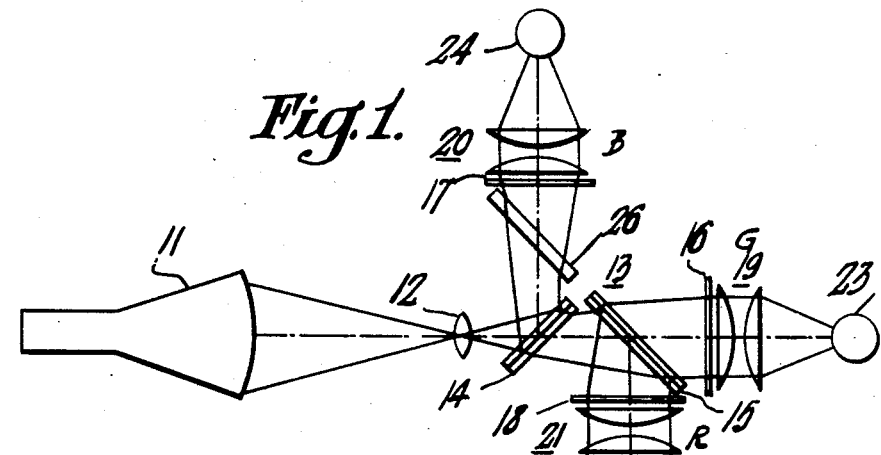
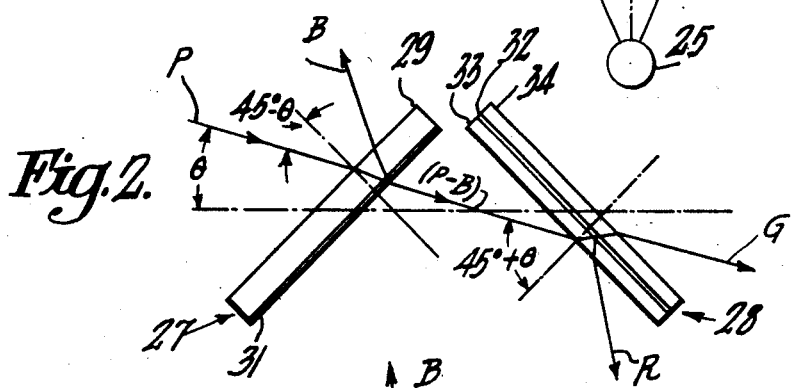
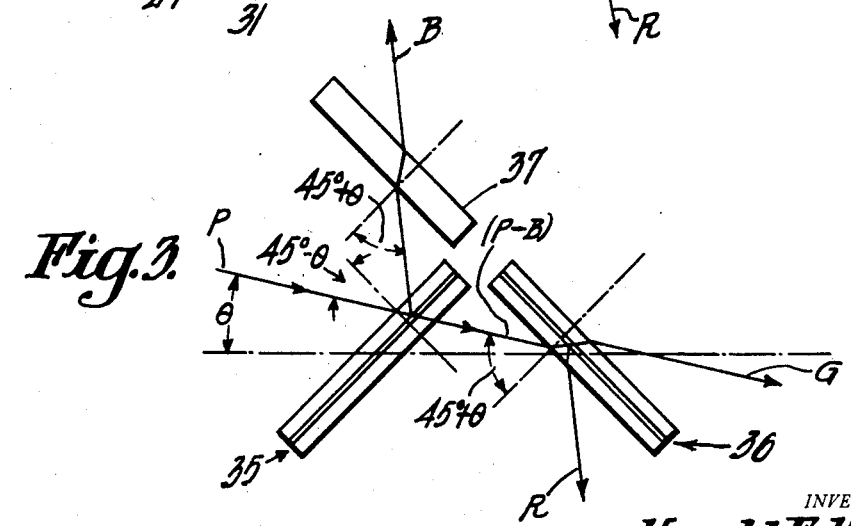
INVENTOR.
Harold E. Haynes

United States Patent Office 2,792,740
Patented May 21, 1957

2,792,740

MULTI-PATH OPTICAL SYSTEMS

Harold E. Haynes, Haddonfield, N. J., assignor to Radio Corporation of America, a corporation of Delaware Application June 28, 1952, Serial No. 296,176

2 Claims. (Cl. 88—1)

This invention relates to optical systems and particularly to light-dividing apparatus used in multi-path optical systems.

It frequently is necessary either to separate a main image into a plurality of subsidiary images or to combine a plurality of separate images to form a composite image. In the television art, for example, some types of color camera apparatus and color image-reproducing apparatus are required to be of a character to effect these two operations, respectively. Another field of use for apparatus of this character is in certain color correction work necessary in the graphic arts and in which a multi-path flying spot type of scanner similar to television apparatus is employed. In systems of the character described, it is necessary for good performance that the apparatus be capable of functioning substantially identically in all of the plurality of light paths.

It, therefore, is an object of this invention to provide an improved multi-path optical system which is capable of producing good registration of all of a plurality of optical images in their respective paths.

Another object of the invention is to provide an improved multi-path optical system capable of substantially identical performance in all of a plurality of light paths and over a relatively wide angle of operation.

Still another object of the invention is to provide an improved multi-path optical system of the reflective type and which is comparatively free of spurious reflected images.

A further object of the invention is to provide an improved multi-path optical system which is capable of wide angle operation in apparatus between a main light path and a plurality of subsidiary light paths for the production of good image registration with a minimum of undesired images.

The invention is embodied in a system in which light-dividing apparatus of the reflective type is employed and in which the reflective elements are angularly disposed to one another and to the main and subsidiary axes of the optical system. The invention comprises the use of auxiliary refractive elements having a minimum of reflective properties and suitably disposed in one or more of the light paths to provide facilities of subjecting a substantial portion of the light in all of the subsidiary light paths to substantially the same conditions of operation. In accordance with an additional feature of this invention, the light reflective elements of the optical system are formed in such a way and disposed in the system so as to effect reflections of the different light rays impinging thereon from the respective front surfaces thereof.

The novel features that are considered characteristic of this invention are set forth with particularity in the appended claims. The invention itself, however, both as to its organization and method of operation, as well as additional objects and advantages thereof, will best be understood from the following description when read in conjunction with the accompanying drawings.

In the drawings:

Figure 1 is a diagrammatic representation of an illustrative embodiment of an optical system in accordance with one feature of the present invention;

Figure 2 is a graphic analysis of a multi-path optical system which does not include the substance of the present invention and is for the purpose of explaining the need for the type of improvement effected by the present invention;

Figure 3 is a similar graphic analysis of a multi-path optical system embodying one of the features of the present invention and showing the manner in which the present invention enables the correction of the inaccuracies occasioned by apparatus such as that shown in Figure 2;

Figure 4:
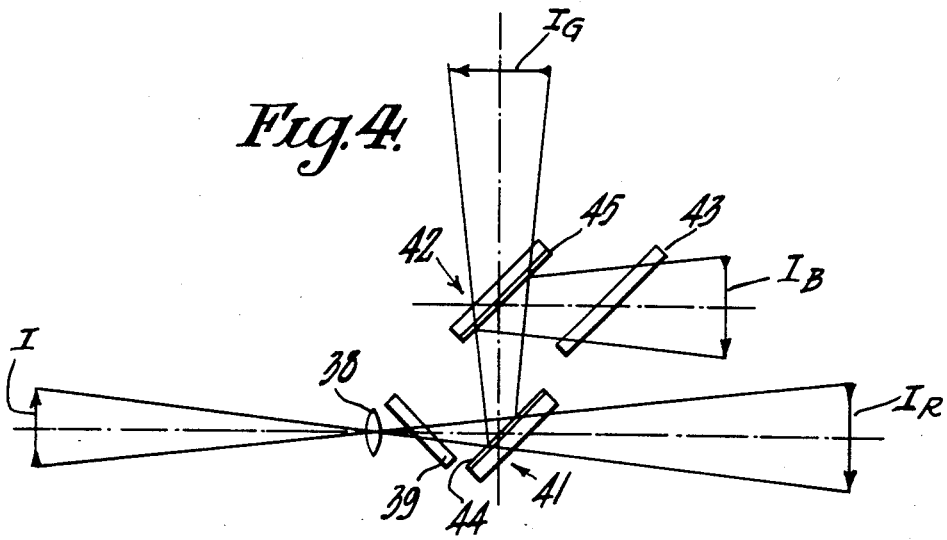
Figure 4 is a diagrammatic illustration of a multi-path optical system embodying the invention in a somewhat different form and including an additional feature of the invention by which spurious reflections are minimized.

In the following description of a multi-path optical apparatus illustratively embodying this invention, reference will be made particularly to a system in which a flying spot scanner is used for the simultaneous scansion of a plurality of color separation transparencies for the purpose of developing representative video signals which may be subsequently processed for any desired purpose, such as color correction as required in some of the graphic arts uses of this type of apparatus. It will be understood, however, that the present invention is not necessarily limited for use with apparatus of this character. Similar apparatus may also be used for the generation of color television signals, for example. Also, it will be apparent that, because of the reversibility of most optical apparatus including that embodying the present invention, the principles may be employed in connection with color image reproduction, in such systems where separate component color images are produced for optical combination to form a complete color image.

With such an understanding of the general field of use of apparatus of the type embodying the present invention, it will be described by first having reference to Figure 1 of the drawings. A cathode ray tube or kinescope 11 is included in a flying spot scanner such as that disclosed in Figure 3 of U. S. Patent 2,022,450, granted to V. K. Zworykin on November 26, 1935, for "Television System." The light from the flying spot kinescope 11 is projected by a lens 12 onto a light-separating device 13. The light-separating device comprises a pair of partial light reflectors 14 and 15 capable respectively of reflecting light upwardly and downwardly into two subsidiary light paths. Both of the partial reflectors 14 and 15 transmit some light into a third subsidiary light path which conveniently may coincide with the main light path derived from the flying spot kinescope 11.

In the system illustratively disclosed in Figure 1, there also is included in each of the subsidiary light paths a transparency which, for example, may constitute a plurality of color separation positives or negatives which are to be examined for the purpose of effecting color corrections, if necessary. The transparency 16 representing the green color component of an image is located in the horizontal subsidiary light path and the transparencies 17, and 18, representing the blue and red component colors of the image, are located in the upper and lower light paths, respectively. For the purpose of clarity of description, the horizontal, upper and lower light paths will be referred to subsequently as the green, blue and red paths, respectively.

The green, blue and red light paths also include condensing lens structures 19, 20 and 21, located on the sides of the respective transparencies 16, 17 and 18 remote from the flying spot kinescope 11. These condensing lens structures serve to direct the light derived from the associated transparencies onto light sensitive apparatus such as photo-sensitive tubes 23, 24 and 25 located respectively in the green, blue and red subsidiary light paths.

It may be seen that the optical apparatus of Figure 1 as described up to this point operates to effect a concurrent scansion of the color separation transparencies 16, 17 and 18. The light which is directed onto the phototubes 23, 24 and 25, therefore, is modulated respectively in accordance with the subject matter of the associated transparencies. The phototubes are effective to develop electrical signal effects in a well-known manner which, since it is not part of the present invention, is not specifically illustrated.

For many purposes, such apparatus operates satisfactorily. However, where greater than average precision is required, some of the inherent limitations of such an optical system have to be corrected.

By suitably making and arranging the partial light reflectors 14 and 15 in a manner to be described subsequently in connection with Figure 2, it is possible to normalize the astigmatism for all paraxial rays. Such a result is attained by suitably placing the light reflective surfaces relative to their transparent supporting members in accordance with the teachings of a copending U. S. application of James E. Albright, Serial No. 191,068, filed October 19, 1950, and titled "Color Selective Optical System," now Patent No. 2,672,502, granted March 16, 1954. In general, this result is attained by requiring the paraxial rays of light in all of the subsidiary paths to traverse substantially identical paths, both as to length and as to the character of the media included.

In addition to an arrangement of the partial light reflectors in accordance with the teachings of the aforementioned Albright invention, whereby to effect the normalization of the astigmatism for the paraxial rays, there is included in the blue subsidiary light path of the apparatus of Figure 1 a transparent compensating element 26 in accordance with one of the features of the present invention. This element is of the same thickness as the overall thickness of either of the partial reflectors 14 and 15 and is of a material having substantially the same refractive index as the transparent supports for the partial reflectors. It also is placed in the blue subsidiary light path at an angle relative to the axis of this light path which is substantially identical to the angle at which the partial reflector 14 is placed relative to the axis of the main light path derived from the flying spot kinescope 11. The use of such an element, together with the partial reflectors 14 and 15, effects an equalization, in all of the subsidiary light paths, of the astigmatism of the oblique rays.

In order to better understand the way in which the apparatus of Figure 1 functions to produce, not only the normalization of the astigmatism for the paraxial rays, but also the desired equalization of the astigmatism for the oblique rays in the various subsidiary light paths, it is considered that an understanding first be had of the conditions which produce unequal astimgatism of the oblique rays in the respective subsidiary light paths with apparatus designed to normalize paraxial ray astigmatism only. For this purpose, reference next will be made to Figure 2 of the drawings.

The arrangement of the light-separating apparatus of Figure 2 is substantially in accordance with the teachings of the copending application of Albright previously referred to. Its main function is to normalize the astigmatism of the paraxial rays in the different subsidiary light paths. An illustrative form of apparatus of this kind includes two partial reflectors 27 and 28 mounted, respectively, at approximately 135° and 45° with the main light path and at approximately 90° to one another. In this way a main light beam, which for example may be of a beam P of panchromatic light, may be separated into its primary components such as red, blue and green light subsidiary beams providing the partial reflectors 27 and 28 are color selective.

The reflector 27, for example, may comprise a supporting member 29 of transparent material, the rear surface of which supports a blue reflective layer of material 31. By means of the reflector 27, then, a blue light ray B is reflected upwardly and the remainder of the panchromatic ray P is transmitted for impingement upon the light reflector 28.

The reflector 28 comprises a layer of red reflective material 32 mounted between two transparent supporting members 33 and 34. The overall thickness of the two light reflectors 27 and 28 should be the same. Also, the supports 33 and 34 of the reflector 28 should be substantially one-half the thickness of the support 29 of the reflector 27. By making the color selective reflecting material 32 of a character to reflect substantially only red light, it is seen that a red ray R is reflected downwardly and the remaining green ray G is transmitted by the reflector 28.

The arrangement of the light reflecting layers relative to their respective supports in the reflectors 27 and 28 in the manner described is in accordance with the teachings of the copending Albright application previously referred to. The normalization of the astigmatism for the paraxial rays follows from the fact that all such rays have the same angle of incidence upon all of the partial light reflectors. It is seen that, in general, the blue rays are required to traverse the full thickness support 29 two times. The red rays are required to traverse the full thickness support 29 once, and the half thickness support 33 of the reflector 28 twice, thereby making a total of two thicknesses of support structures. Similarly, the green rays traverse the full thickness support 29 once and, in succession, the half thickness support 33 and 34 each once, making a total of two thicknesses of supporting structure.

The apparatus upon which the blue, red and green light rays are caused to impinge may conveniently be located at distances spaced from the reflectors 27 and 28 so that the total distances traversed in air by any of the light beams also is made substantially equal. Such apparatus operates quite satisfactorily for the normalization of the astigmatism for the paraxial rays. However, as will be demonstrated, there remains some unequal astigmatism for the oblique rays.

For example, consider the light ray P impinging upon the reflector 27 at an angle $\theta$ relative to the main axis of the optical system. Inasmuch as the reflector 27 is mounted at an angle of approximately 135° with respect to the main optical axis, it is seen that the ray P impinges upon the reflector 27 at an angle of incidence equal approximately to $(45°-\theta)$. Accordingly, it is seen that the distance traversed by the ray B in the support 29 of the reflector 27 is a function of the ray's angle of incidence.

The ray P-B transmitted through the reflector 27 also makes an angle $\theta$ with the main optical axis. However, because of the described orientation of the reflector 28 in the main light path at a 45° angle with the main optical axis, it is seen that the ray P-B has an angle of incidence upon the reflector 28 of $(45°+\theta)$. Accordingly, it is seen that the ray R reflected by the layer 32 will traverse the half thickness support 33 twice for a distance which is a function of the angle of incidence of the ray P-B. Since this angle of $(45°+\theta)$ is different from the incidence angle of $(45°-\theta)$ for the ray P, the distances traversed by the rays B and R in the respective supports 29 and 33 are different and, consequently the astigmatism for the two oblique rays is not equal.

The ray G which is transmitted by the reflector 28 also can be seen to have an astigmatism which is substantially similar to that of the ray R, since it also is affected by the incidence angle of the ray P-B. Consequently, the astigmatism for the oblique ray G is not equal to that of the ray B.

Reference now will be made to Figure 3 for a description of one form of apparatus embodying the present invention which functions effectively, not only to normalize astigmatism for the paraxial rays but also to effectively equalize astigmatism for oblique rays. This apparatus includes two partial light reflectors 35 and 36 which, if desired, may be color selective. Both of these reflectors are of the same general form as the reflector 28 of Figure 2 that is, the light reflective material is mounted between two half thickness transparent supports. Also, as in the apparatus of Figure 2, the reflectors 35 and 36 are mounted relative to the main optical axis and to one another so that an incident ray P is partially reflected upwardly as ray B, partially reflected downwardly as ray R, and partially transmitted as ray G. There also is included in the upper light path for the ray B a transparent compensating member 37. The compensating member is made of material having substantially the same refractive index as the material from which the supports for the reflectors 35 and 36 are made. It also has a thickness which is substantially the same as the overall thickness of the two reflectors. It is mounted at an angle of approximately 135° relative to the axis of the subsidiary light path which is substantially the same orientation relative to its axis as that of the reflector 35 to its associated axis. The apparatus of Figure 3 is substantially the same as that shown and described in connection with Figure 1.

In view of the foregoing description of the manner in which the teachings of the copending Albright application function to normalize astigmatism for the paraxial rays, it will be seen that the apparatus of Figure 3 also performs a similar function. The ray B, for example, traverses one of the half thickness supports of the reflector 35 twice and the full thickness of the compensating member 37 once, making a total thickness of refractive material equal approximately to two. The ray R traverses both of the half thickness supports of the reflector 35 once and one of the half thickness supports of the reflector 36 twice for a total thickness of refractive material equal approximately to two. Similarly, the ray G traverses both of the half thickness supports of the reflectors 35 and 36 once for a total thickness of refractive material of approximately two. It, therefore, may be seen that, by forming the partial reflectors 35 and 36 as sandwiches substantially as described and by including the compensating member 37 in one of the subsidiary light paths, this apparatus also functions to provide the desired normalization of the astigmatism for the paraxial rays.

The form of apparatus shown in Figure 3 also functions to effect substantial equalization of the astigmatism for the oblique rays. This may be seen by again considering the respective angles of incidence for typical oblique light rays. The ray P, for example, impinges upon the reflector 35 at an angle of (45°−θ) and the ray B is reflected from this member also at the same angle. In this case, however, by reason of the described disposition of the compensating member 37 in the subsidiary light path, it is seen that the ray B, as it impinges upon the compensating member, makes an angle of (45°+θ) with the normal to the compensating member. It is seen that, since the relationship of the reflectors 35 and 36 relative to one another and to the main optical axis is substantially the same as that of the reflectors 27 and 28 of Figure 2, the distances traversed in the supporting members of the reflector 36 by the rays R and G are substantially unchanged from the distances traversed by the corresponding rays emerging from the apparatus of Figure 2. Furthermore, because of the substantial equality of the angles of incidence of the oblique rays upon the respective members 36 and 37, it is seen that equal distances are traversed by the oblique light rays in these members. Also, it is seen that all oblique rays traverse equal distances in the reflector 35. Thus, it is seen that the apparatus of Figure 3 serves both to normalize the astigmatism for the paraxial rays and to effect substantial equalization of the oblique rays.

In view of the foregoing description of the astigmatism compensating apparatus, it is seen that the provision of such an optical system in a system such as that shown in Figure 1 enables a concurrent scansion of the color separation transparencies 16, 17 and 18 by means of a flying spot scanner including a kinescope 11 without generating spurious signals by the respective photo-tubes 23, 24 and 25 representative of any dissimilar astigmatism either for the paraxial rays or for the oblique rays. Consequently, it enables the use of such apparatus in an image-forming system having either a high optical speed or a large field angle or both. For example, such a system has been used successfully for color correction work in certain of the graphic arts with optical systems producing a 4 x 5 inch image, approximately 18 inches from a color separation transparency. In such a case, the extreme oblique rays make an angle of approximately 10° with the axis.

It has been found, however, that while apparatus such as that shown in Figure 1 is quite successful in making astigmatism substantially the same in all the subsidiary light paths, there is a tendency to produce spurious images from the front surfaces of the transparent supports for the partial light reflectors. These images are spaced from the desired images which are reflected from the light-reflective material. According to another feature of the present invention, an astigmatism compensating optical system for separating light into a plurality of paths also is provided with means obviating, or at least minimizing, any spurious reflections.

One such system is shown diagrammatically in Figure 4 to which reference now will be made. Light from an image I is projected by a lens 38 onto a light-separating optical system embodying the invention. The system includes a first transparent compensating member 39 placed so as to make an angle of 45° with the main optical axis. The light which is transmitted through the compensating member 39 impinges upon a partial light reflector 41. The light which is not reflected by the reflector 41 is transmitted thereby to form an image $I_R$. The light which is reflected by the reflector 41 impinges upon a second partial light reflector 42. Light which is transmitted by the reflector 42 forms an image $I_G$. The light which is reflected by the reflector 42 is caused to traverse a second compensating member 43 and then to form an image $I_B$.

The two partial light reflectors 41 and 42 and the compensating members 39 and 43 all have the same overall thickness and, except for the light-reflecting portions of the reflectors 41 and 42, all have substantially the same index of refraction. The partial light reflectors 41 and 42 are of a different form than any of those previously described. It is seen that the light-reflective layers 44 and 45 of the reflectors 41 and 42, respectively, are located on the front surfaces of their respective transparent supports. By this means, the undesired images caused by spurious reflections are materially reduced. It has been found that such an arrangement produces a substantial improvement over apparatus such as that shown in Figure 1 with respect to the formation of spurious images.

Figure 5:
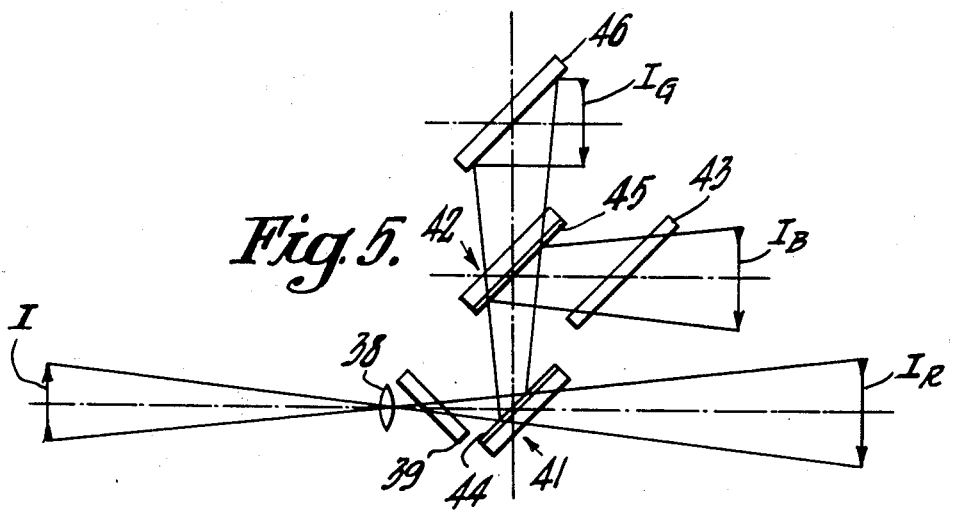
Figure 5 is a diagrammatic illustration of a modified form of the apparatus of Figure 4 and showing another multi-path optical system embodying the invention.

Figure 5 is an arrangement of apparatus substantially similar to that shown in Figure 4 which may be used where it is desired to have all of the images formed in one plane or at least in planes parallel to another. For example, such an arrangement is desirable for a color television camera using three signal-generating tubes such as image orthicons, for example. The apparatus is substantially the same as that shown in Figure 4 with the addition of a front surface mirror 46 located so as to form the image $I_G$ substantially parallel to the other images $I_B$ and $I_R$.

In order to demonstrate the benefits to be derived from the use of apparatus such as that shown in Figures 4 and 5 so as to minimize the deleterious effects of spurious reflections, a comparison will be made with the apparatus of Figure 1. It will be understood that all the surfaces of the partial reflectors and of the auxiliary compensating members from which it is desired to minimize reflections are treated with a low reflecting coating such as that forming the subject matter of Patent 2,397,929, granted to G. L. Dimmick for "Reduction in Reflection from Glass." In the apparatus of Figure 1 it is assumed that the light derived from the flying spot kinescope 11 is to be equally divided into the three subsidiary paths including the color separation transparencies 16, 17 and 18. Therefore, the partial reflector 14 is required to reflect as its interface including the partially reflecting coating approximately 33% of the light impinging upon it. The remaining 67% is transmitted through the reflector 14 for impingement upon the reflector 15. The interface of this reflector is designed to effect a partial reflection of approximately 50% of the light impinging thereon so that the remaining 50% is transmitted.

In a practical form of apparatus such as that shown in Figure 1 in which the reflectivity of the interface of the reflector 14 is approximately 33%, it has been found that the reflectivity of the treated front and rear surfaces is approximately 1.5%. Therefore, the spurious reflections from the front and rear surfaces of the partial reflector 14 have respective intensities which are approximately 4.5% and 2% of that of the desired image reflected from the interface. The fact that the intensity of the spurious image reflected from the rear surface of the reflector 14 is less than that reflected from the front surface is because these spurious images will have twice traversed the partially reflecting layers of the interface. In a similar manner, it may be seen that the intensity of the spurious images produced by the front and rear surfaces of the partial reflector 15 are respectively 3% and 0.75% of the intensity of the desired image reflected from the interface of this reflector.

With reference to the apparatus of Figure 4, it will be assumed that the surface of the several components from which reflections are undesired are treated with low reflecting coatings similar to the components of the apparatus of Figure 1. In order to compare the operation of the apparatus of Figure 4 with that of Figure 1, it is seen that, since the desired partial reflections are effected by the layers 44 and 45 located respectively on the front surfaces of the supporting members of the reflectors 41 and 42, there are no counterparts to the spurious reflections from the front surfaces of the partial reflectors of the apparatus of Figure 1. However, there are spurious reflections produced from the rear surfaces of the partial reflectors 41 and 42. The intensity of the spurious reflected image produced by the reflector 41 is approximately 0.25% of the intensity of the desired image. Similarly, the intensity of the spurious image produced by the partial reflector 42 is approximately 0.75% of the intensity of the desired image produced by this member. In order to compare the results produced by the apparatus of Figure 4 quantitatively with those produced by the apparatus of Figure 1, the ratio of the total spurious light from both front and rear surfaces to the desired light for each of the partial reflectors will be taken as a figure of merit. In the case of the light impinging upon the transparency 17 of Figure 1 and the corresponding image $I_G$ of Figure 4, the gain produced by the apparatus of Figure 4 over that of Figure 1 is approximately 26 to 1. Similarly, with respect to the light impinging upon the transparency 18 of Figure 1 and the corresponding image $I_B$ of Figure 4, the gain produced by the apparatus of Figure 4 over that of Figure 1 is approximately 5 to 1. In both instances it is seen that, where spurious images produced by unwanted reflections from surfaces other than those from which it is desired to cause reflections are concerned, substantial improvements in the minimizing of such undesired reflections are made by employing the additional feature of the invention embodied in the apparatus of Figures 4 and 5. It is seen that a greater improvement is made with respect to an image such as $I_G$ of Figure 4 than in the image $I_B$ of this figure. This, however, is to be expected because only one partial reflection of the light derived from the image I is required to produce the image $I_G$, while two reflections are required to produce the image $I_B$.

It, therefore, may be seen from the foregoing description of several illustrative embodiments of the various features of the present invention that there is provided an improved multipath optical system which is capable of producing better registration of all of a plurality of optical images in their respective paths than has heretofore been achieved. The invention, furthermore, makes possible substantially identical performance in all of a plurality of light paths over a relatively wide angle of operation.

It is to be understood that the principles underlying the present invention are generally applicable to multipath light systems employing partially reflective components. Such systems may be employed either for dividing light from a source into a plurality of subsidiary light paths or for combining the light from a plurality of related subsidiary paths into a common single path. The multi-path light systems in which the present invention may be employed may be either black and white or color systems. In the event that the invention is to be embodied in a black and white system, the partial reflectors may be of a neutral character, whereas in a color system they may, if desired, be of a color-selective character. Moreover, it will be understood that either complete images or partial ones produced by a process such as scanning, may be used in systems embodying the present invention.

It also is to be understood that a multi-path optical system in accordance with this invention is effective to equalize astigmatism for both paraxial and oblique light rays in the plurality of subsidiary light paths, but does not neutralize or completely eliminate the astigmatism which is inherently produced by the angular arrangement of the light divider reflectors relative to the optical axis of the system. Other means, forming no part of the instant invention, are required for astigmatism neutralization. One such device comprises a pair of transparent plates mounted at right angles to each other, in a manner similar to the relative positioning of the reflectors 14 and 15 of Figure 1 for example, but rotated 90° about the optical axis. The neutralizing plates should be of the same thickness as the overall thickness of the partial reflectors and should be made of a material having the same refractive index as the partial reflector supports. Such a means for neutralizing astigmatism in a light-dividing system of this character forms part of the subject matter of a copending U. S. patent application of L. T. Sachtleben and G. L. Dimmick, Serial No. 215,722, filed March 15, 1951, and titled "Color Television Optical System," now Patent No. 2,672,072, granted March 16, 1954.

The nature of the invention may be ascertained from the foregoing description of several illustrative embodiments thereof. Its scope is pointed out in the appended claims.

What is claimed is:

1. In a multi-path optical system, apparatus for dividing light in a main path into three subsidiary paths, one subsidiary light path being substantially in line with said main light path and the other two subsidiary light paths being substantially at angles to and on opposite sides of said main light path, said apparatus comprising, two partial light reflectors having substantially the same overall thickness, each of said reflectors including a substantially flat transparent support and a layer of material capable of reflecting and transmitting different respective portions of light incident thereon, each of said layers being mounted approximately midway between the exterior surfaces of its support, said reflectors thereby functioning to equalize astigmatism for paraxial rays of light in said subsidiary light paths, a first one of said reflectors being mounted at an oblique angle to said main light path and the second one of said reflectors being mounted in spaced relation to said first reflector and at an oblique angle to said main light path, and a substantially flat transparent compensating member mounted in a subsidiary light path derived from said first reflector, said compensating member being of substantially the same thickness as the overall thickness of each of said reflectors and of a material having substantially the same refractive index as that of said reflector supports, whereby to equalize astigmatism for oblique rays of light in said subsidiary light paths.

2. In a multi-path optical system, apparatus for dividing light in a main path into three subsidiary paths, one subsidiary light path being substantially in line with said main light path and the other two subsidiary light paths being substantially at right angles to and on opposite sides of said main light path, said apparatus comprising, two partial light reflectors having substantially the same overall thickness, each of said reflectors including a substantially flat transparent support and a layer of material capable of reflecting and transmitting different respective portions of light incident thereon, each of said layers being mounted approximately midway between the exterior surfaces of its support, said reflectors thereby functioning to equalize astigmatism for paraxial rays of light in said subsidiary light paths, a first one of said reflectors being of a kind to reflect approximately one-third and to transmit approximately two-thirds of the light incident thereon and being mounted at an angle of substantially 135° to said main light path and the second one of said reflectors being of a kind to reflect and transmit respectively approximately one-half of the light incident thereon and being mounted in spaced relation to said first reflector and at an angle of substantially 45° to said main light path, and a substantially flat transparent compensating member mounted in a subsidiary light path derived from said first reflector, said compensating member being of substantially the same thickness as the overall thickness of each of said reflectors and of a material having substantially the same refractive index as that of said reflector supports, whereby to equalize astigmatism for oblique rays of light in said subsidiary light paths.

References Cited in the file of this patent

UNITED STATES PATENTS

| | | |
|---|---|---|
| 1,238,775 | Ives | Sept. 4, 1917 |
| 2,027,369 | Bourges | Jan. 14, 1936 |
| 2,392,978 | Dimmick | Jan. 15, 1946 |
| 2,405,063 | Sisson | July 30, 1946 |
| 2,415,191 | Rajchman | Feb. 4, 1947 |
| 2,418,627 | Dimmick | Apr. 8, 1947 |
| 2,560,351 | Kell et al. | July 10, 1951 |
| 2,604,808 | Sachtleben | July 29, 1952 |

FOREIGN PATENTS

| | | |
|---|---|---|
| 25,908 | Great Britain | Nov. 16, 1906 |
| 586,957 | Great Britain | Apr. 9, 1947 |